United States Patent [19]

Collins

[11] Patent Number: 5,037,015

[45] Date of Patent: Aug. 6, 1991

[54] CAP WITH INTEGRAL POURING SPOUT FOR PITCHERS

[75] Inventor: Harry F. Collins, Minnetonka, Minn.

[73] Assignee: Service Ideas, Inc., Minneapolis, Minn.

[21] Appl. No.: 465,640

[22] Filed: Jan. 22, 1990

Related U.S. Application Data

[63] Continuation of Ser. No. 28,882, Mar. 23, 1987, abandoned.

[51] Int. Cl.⁵ .............................................. B67D 3/00
[52] U.S. Cl. .................................. 222/472; 215/13.1;
222/482; 222/509; 222/518
[58] Field of Search ............... 222/470, 472, 473, 505,
222/509, 511, 517, 518, 129, 481, 482; 215/13.1

[56] References Cited

U.S. PATENT DOCUMENTS

| | | |
|---|---|---|
| D. 286,732 | 11/1986 | Darnell . |
| D. 292,664 | 11/1987 | Zimmermann . |
| 840,813 | 1/1907 | Whitaker ............................ 222/482 |
| 1,349,830 | 8/1920 | Goldstein .......................... 222/518 |
| 1,805,257 | 5/1931 | Pitt ..................................... 222/518 |
| 2,502,821 | 4/1950 | Brauner ............................. 222/511 |
| 2,685,978 | 8/1954 | Crockett ............................ 222/511 |
| 3,137,417 | 6/1964 | Zetterstrom ..................... 222/472 X |
| 3,863,673 | 2/1975 | Sitton ............................... 222/511 X |
| 4,648,535 | 3/1987 | Zimmerman ....................... 222/472 |
| 4,676,411 | 6/1987 | Simasaki ........................ 222/472 X |

OTHER PUBLICATIONS

Pages from the 1986 Cambro Mfg. Co. catalog.
Pages from the 1985 Rubbermaid Commercial Products Co. catalog.
Pages from an undated Continental Carlisle catalog.
Pages from an undated Vollrath Co. catalog.

*Primary Examiner*—Kevin P. Shaver
*Attorney, Agent, or Firm*—Moore & Hansen

[57] ABSTRACT

A cap having a body which may be insertably mounted into the open top of a container and form a fluid-tight seal therewith an interior cavity, and a valve aperture positioned to fluidly communicate with the interior cavity and the receptacle portion of the container when the cap is mounted thereon. A valve member slidably carried on a valve post is disposed across the valve aperture, thereby normally sealing the valve aperture. The valve post may be moved to selectively open the valve aperture by depressing a thumb pad, and will automatically return to the closed position when the thumb pad is not being pressed due to the action of a spring. One or more enclosed spouts are molded integrally with the cap body, and fluidly communicate with the interior cavity. These spouts may be positioned at the sides, rather than the front, of the containers.

13 Claims, 3 Drawing Sheets

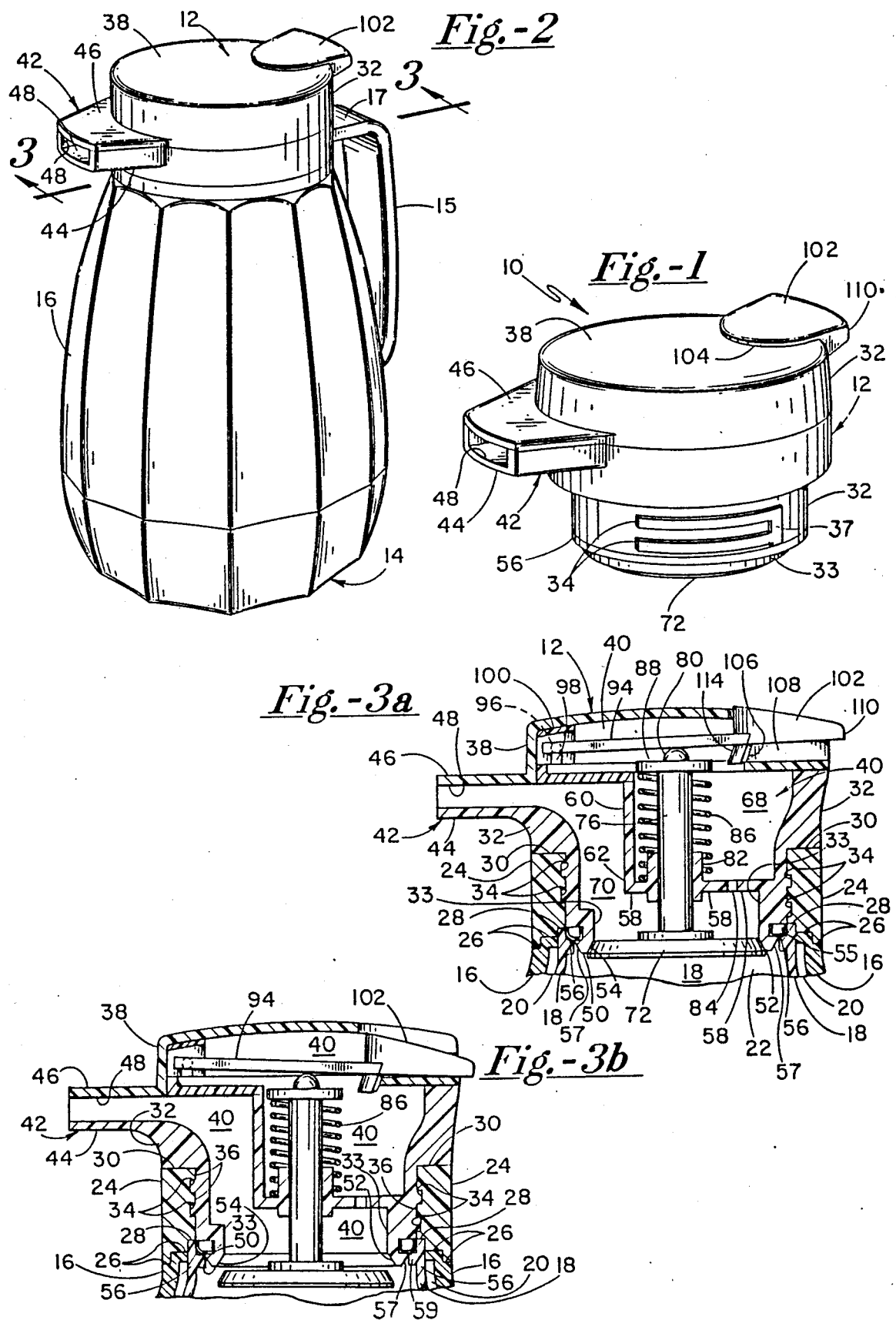

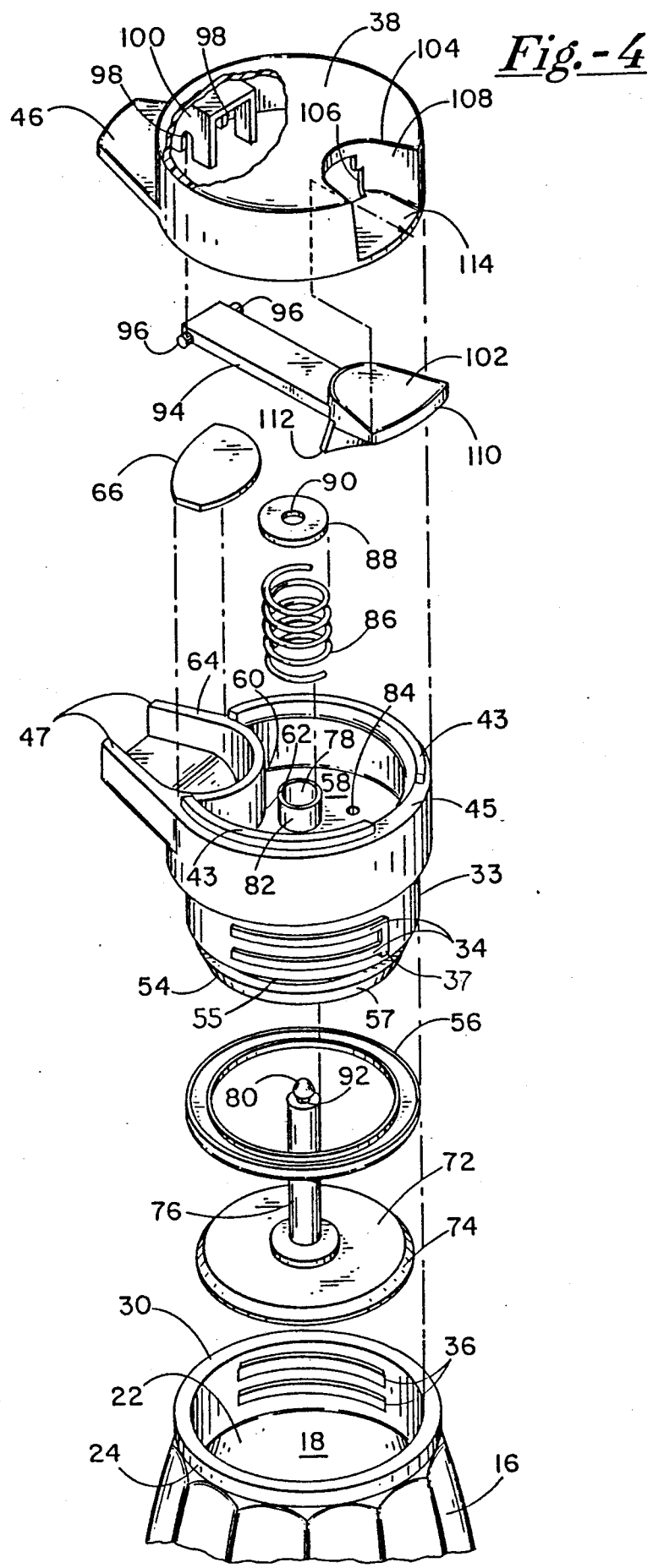

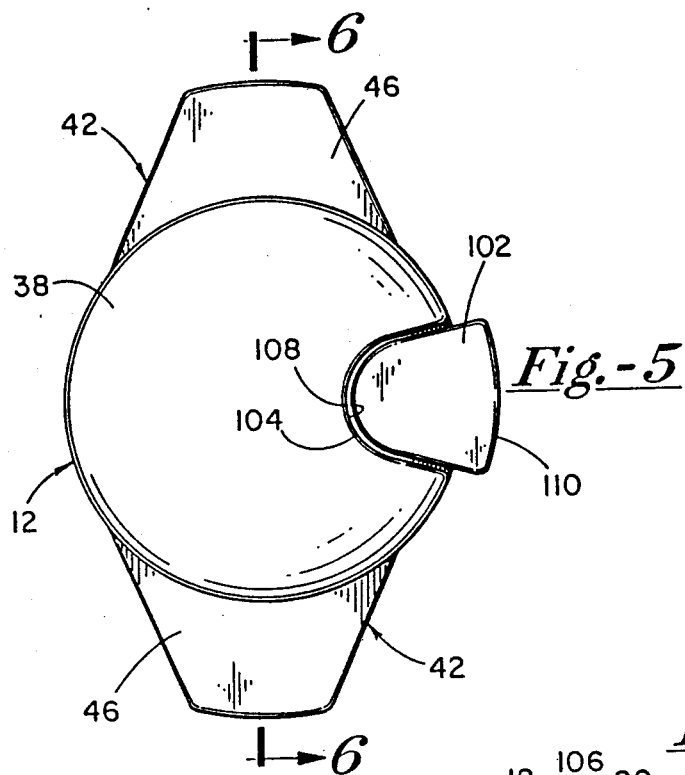
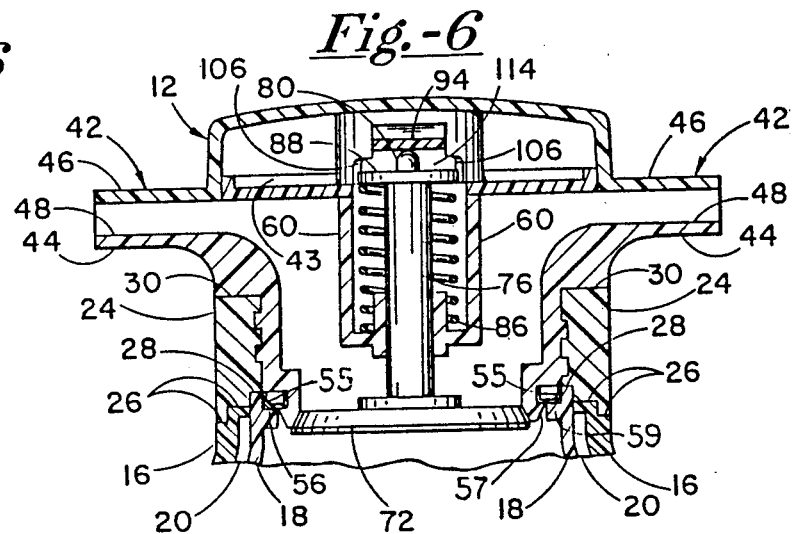
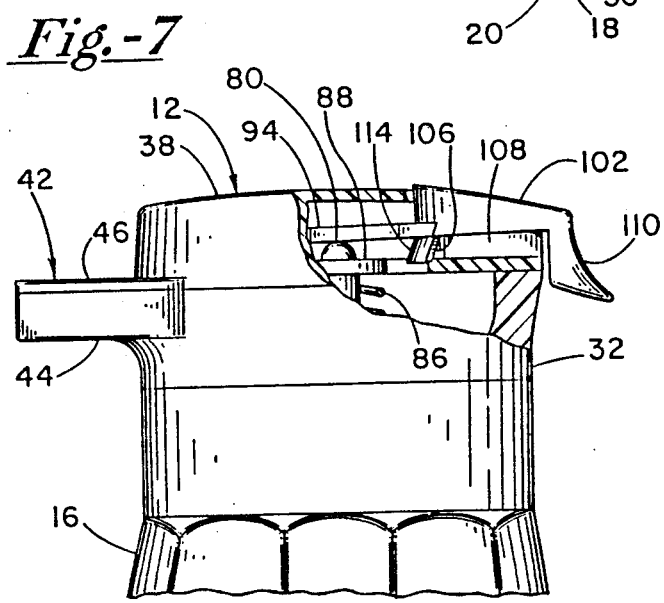

CAP WITH INTEGRAL POURING SPOUT FOR PITCHERS

This is a continuation of application Ser. No. 07/028,882 filed on Mar. 23, 1987 now abandoned.

BACKGROUND OF THE INVENTION

This invention relates generally to lids and spouts for beverage serving containers, and particularly to a cap having an integral spout and push-button valve means which may be inserted into the open top of an insulated beverage server used in commercial and institutional settings.

Beverage serving containers of the type shown in U.S. Design Pat. No. 184,715 have been used in restaurants and similar settings for over thirty years. This beverage serving container incorporates a receptacle portion having a twin-walled structure with thermal insulating foam injected therebetween, a wide-rimmed pouring spout, a pivotably hinged lid, and a handle. The lid acts as a thermal barrier to retain the heat of a liquid—such as coffee or tea—placed in the container, and may be pivoted open for pouring by pressure on the thumb pad which is situated adjacent to the top of the handle. The basic design and operation of these beverage serving containers has remained substantially unchanged throughout this thirty year span.

Many other insulated beverage servers have been introduced since U.S. Design Pat. No. 184,715 issued, these other insulated beverage servers having a twin-wall construction and insulating foam therebetween, but each insulated server having a substantially unique outward design or appearance. Such insulated beverage servers have been the subject of numerous design patents, and representative examples may be seen in the insulated servers manufactured and marketed by: Vollrath Co. of Sheboygan, Wisconsin; Rubbermaid Co. of Winchester, Virginia; Cambro Co. of Huntington Beach, California; and Continental Carlisle Co. of Oklahoma City, Oklahoma.

Other beverage serving containers include glass or rigid plastic open-topped water pitchers having curved, recessed, or out-turned pouring lip portions along the rim. These pouring lips are generally situated on the front of the pitcher opposite the handle, although they may be placed anywhere along the rim. Water pitchers of this design are presently marketed under many names and by many firms, one such being the Bouncer II ® Carb-x ® pitcher from Rubbermaid Co. Other types of water pitchers, these also being molded from plastic but having enclosed spouts, are well known. Pitchers of this kind are currently marketed under the names Tempo, Flair, and Stonelook by Vollrath Co.

Another type of pitcher is molded from flexible plastic with a partially enclosed pouring spout extending from the front of the pitcher wall adjacent to the rim. A lid having a downwardly depending skirt portion defining one or more pouring or straining apertures is inserted into the open top of the pitcher, and the lid may then be rotated within the pitcher to align the desired aperture with the pouring spout. Such pitchers are commonly used with juices and other beverages mixed from concentrates or powders, and may be found in many household and institutional settings. Such pitchers are currently marketed as Economy Pitchers by Rubbermaid Co.

Coffee pots, teapots, and formal servers made from metal or ceramic and having enclosed curved, fluted, or tubular pouring spouts extending from the midsection of the receptacle wall, hinged lids, and handles are also relatively well known. Representative examples of such pots and servers are depicted in U.S. Design Pat. No. 287,213 (in which the spout is not completely enclosed) and the Gooseneck Servers currently marketed by Vollrath Co.

These pitchers, pots, and single-wall servers are subject to several drawbacks. They seldom have any notable thermal insulating properties, and will not retain the heat of a beverage for any extended period if left sitting at room temperatures. The hinged lids of many of the servers, while providing some thermal barrier, still permit a great deal of steam and heat to escape around the edges of the lids. Such servers are suited more for use with cold beverages, where the entire server may be placed within a refrigerator, and removed only periodically for use.

Although many of the articles are suitable for use in households, they do not possess the structural integrity or resiliency to be used in commercial or institutional settings where they are subjected to continual rough handling, frequently being dropped, and repeated cleaning. Moreover, these articles cannot withstand the high water temperatures—on the order of 180 to 210 degrees F.—present in commercial dishwashers and required by law in many states to properly clean and sterilize the receptacles and spouts.

The majority of these serving containers, due to their design and the requisites of the manufacturing processes used to form them, are also not aesthetically acceptable for use in commercial or institutional settings such as restaurants or hotels where the servers may routinely be left unattended on the tables for long periods of time, and are often used by the customer or employee rather than trained food service personnel.

The wide spouts or shallow recessed lips in the rims of several of these containers make them difficult to accurately pour beverages from, and often result in spills or overflows unless used cautiously.

Another important drawback common to several of these serving containers is the danger that each, if accidentally overturned or tipped, may spill their contents onto the tabletop and persons seated thereabouts. In such cases where the beverage is hot coffee or tea, the frequent result is serious burns to those individuals, and accompanying exposure to legal liability on the part of the owners of the establishments, the manufacturers, and sellers of the servers. The containers having hinged lids or open spouts cannot be adequately sealed. Those pitchers which have closures to seal the spout may not have a sufficiently secure method of fastening the lid in place, or make it contingent upon the user to ensure that the closure is sealed after each pouring, thus defeating the reliability of any such sealing measures.

Insulated beverage storage and carrying containers, such as those commonly found under the brand name "Thermos" and referred to commonly as vacuum bottles, offer a means of tightly sealing the open top of the insulated receptacle portion with a resilient plastic screw-on cap. Such a design is useful for people who carry a meal with them to work or school, or for recreational purposes, but have generally not proven suitable for use in serving beverages in dining establishments or in the household.

U.S. Design Pat. No. 286,732 discloses a vacuum jug having a pouring handle, a spout formed as an integral part of the container wall, and a cap which is threadedly received into the open neck of the container. To open and close this vacuum jug, it is necessary to turn or unscrew the threaded cap of the container, which then aligns a valve opening or tunnel in the bottom of the lid with the spout.

A similarly styled insulated serving pitcher, marketed under the name of "Krups Kanne" by Krup Co. of Germany, also utilizes a threaded cap which is inserted into the open neck of a container, and has an enclosed spout integrally molded into the top of the container rim. Rather than having a valve aperture, however, the bottom of the cap has a smooth, semicircular surface with an annular silicone gasket. The inner wall of the container neck is formed to match the curvature of the bottom surface, such that a fluid-tight seal is formed between the inner wall of the container neck and the semicircular surface and gasket just below the spout. To open the container for pouring, the cap is unscrewed slightly to create a gap between the bottom surface of the cap and the inner wall of the container neck, and may remain in this position after use.

Another type of insulated server—commonly referred to as an air pot or pump pot—incorporates an enclosed spout located near the top of the container, and a syphon pump which dispenses the liquid through the spout when the user presses down on the lid of the container. A representative example of such an air pot is the "Diamond Airpot" manufactured by Dia Vacuum Bottle Ind. Co. Ltd. of Hong Kong.

Such pump pots are limited, however, by their need to be rested on a supporting surface when used. There are also difficulties in disassembling, refilling, and cleaning the internal components on the pump mechanism and receptacle. These limitations make the pump pot containers unsuitable for use as a beverage server in commercial or institutional settings where they may be carried between tables by a waiter or waitress pouring beverages with one hand, and must refill the containers rapidly and frequently.

Serving pitchers closely resembling the pump pot and vacuum bottle type containers, but having a slide or push-button controlled valve and an enclosed spout molded into the top of the receptacle wall, are also known. One representative product having a push-button controlled valve is the "Thermique" brand server from Corning Glass Works, although many manufacturers have developed servers which operate in a similar manner, and have a widely varying range of appearances.

In these pitchers, the valves are actuated either by turning a portion of the lid to orient the valve aperture with the pouring spout or by depressing the lid or a centrally located push button. In each case, the valve aperture may be locked or left open by the user, and the enclosed pouring spout is formed from two or more connecting portions of the container wall and rim which are molded together.

The position of the valve control in the center of the lid on several of these pitchers makes it necessary to use two hands when dispensing a beverage, one hand to grasp the handle and tilt the server, and the other hand to actuate the valve. The construction of such containers, as in the case of the pump pots, makes them difficult to use with automatic refilling machines since the cover must be disassembled each time before the receptacle portion is placed beneath the refill spout, and reassembled thereafter.

One vacuum bottle, the "Coffee at a Touch" vacuum server manufactured by Dia Co., has a push-button control which is located at the rear portion of the lid above the handle, making the push button accessible to the thumb of the hand holding the vacuum bottle.

These servers, particularly those which have a vacuum liner or rotation type valve, have relatively slim necks and thus even smaller diameter valve apertures. The maximum displacement of the valve member from the valve aperture is similarly quite narrow. Consequently, the maximum flow rate which may be achieved with such a server is proportionately limited.

Because the spouts are attached to or molded as part of the receptacle portion, these containers have many recesses surrounding the top rim which make properly cleaning the containers a difficult proposition. Automatic dishwashing machines are used in many institutional settings, with the servers being inverted, set on racks, and spray washed several times each day. In this situation, the enclosed, rim-mounted pouring spouts preclude adequate spray washing and prevent proper drainage or drying.

Further, since the spouts and valve assemblies are distinct components (the valve assemblies being connected to the lid while the spout is attached to the receptacle wall) the lids must be threaded into the top of the pitcher by several rotations in order to assure a fluid-tight seal between the valve and spout. When the lids must be removed and reattached between each use or each time the container is washed, which may occur several times an hour in an institutional setting, this method for attaching the lid to the receptacle becomes inconvenient and time consuming.

Another type of serving apparatus is the free-standing plastic or steel tankard, which has a spout and push button or lever-operated valve located at the bottom of a large capacity tank. Because this capacity is on the order of five or more gallons, these tankards cannot be carried or used to pour, and further cannot be washed using conventional commercial dishwashers. Examples of such tankards include Thermovats by Continental Carlisle Co. and Camtainers by Cambro Co.

It should be noted that the majority of beverage serving containers have the pouring spouts situated opposite the handle, so that the spout faces the front of the container with the handle being attached to the rear of the container. Such a configuration is not biomechanically efficient for people who must serve beverages from a standing position behind or between customers. It is common in this situation to see the person pour from the sides of an open top pitcher, even when that pitcher has no pouring lip on the sides of the rim.

Waiters and waitresses become very proficient at pouring from the sides of such open-top pitchers, and can accurately fill cups and glasses from a great height, both forehandedly and backhandedly, whereas such accuracy cannot be achieved when pouring from the front of a conventional pitcher. When using pitchers having lids or enclosed spouts, however, it is necessary for the person to pivot the pitcher around in their hand between a forehand and backhand position. This requires that the handle of the pitcher be balanced on the side of the index finger, and then gripped by the weakest portion of the fingers furthest from the palm, such that the person has little leverage to support the pitcher and little control over the pouring rate. This can be the cause of many spills and dropped containers. Moreover, the process of pivoting the server in this manner is inconvenient, takes additional time and effort, distracts the customer, and appears unprofessional—each factor being a significant consideration for those managing establishments where swift and proficient service is both expected and prided.

Some oriental porcelain teapots, particularly those having handles which extend horizontally straight out from the side of the pot, have an enclosed gooseneck-type spout positioned on one side of the pot, in much the same way as the oriental tea ladle is designed. While displaying some biomechanical utility when compared to teapots where the handle and spout are positioned on opposite sides, such a design presents the disadvantage of not being able to pivot the teapot to serve in both a forehand and backhand manner.

BRIEF SUMMARY OF THE INVENTION

It is therefore one object of this invention to design a cap with an integral pouring spout that may be mounted onto existing beverage serving containers to form a fluid-tight seal therebetween, and which permits a beverage to be poured from the container into a cup or other article.

It is a related object of this invention to design the above cap wherein the pouring spout is enclosed, such that a user may pour a beverage into a cup more accurately, and avoid pouring or spilling the beverage onto a tabletop or other surface.

It is another object of this invention to design the above cap to include a valve means such that no fluid may flow from the container through the enclosed spout, or otherwise escape or spill from the top of the container, in the event the container is inadvertently tipped or completely overturned.

It is a related object of this invention to design the above cap such that the valve means may be easily and conveniently actuated by the user, and such that the valve means may permit a suitably rapid flow rate so that conventional drinking cups may be filled without undue delay.

It is further a related object of this invention to design the above cap such that the valve means will automatically close to seal the fluid flow path responsive to the user ceasing to actuate the valve means.

It is still another object of this invention to design the above cap such that it may be easily inserted into the open top of the beverage serving container and secured thereto, and may similarly be easily removed for cleaning and refilling the container.

It is an additional object of this invention to design the above cap to possess thermal insulating properties generally commensurate with those of the insulated beverage serving containers with which the cap may be used.

It is a related object of this invention to design the above cap such that, when used with an insulated server, the total thermal insulation provided increases substantially over that provided by the same container having a hinged lid.

It is another object of this invention to design the above cap such that it may be inexpensively manufactured and assembled, yet provide significant structural integrity, durability, and be aesthetically pleasing.

It is a unique object of this invention to design a cap with one or more integral pouring spouts positioned such that a person may pour in either a forehanded or backhanded manner from the sides of the pitcher.

Described briefly, the cap of this invention has a body which may be insertably mounted into the open top of a container and form a fluid-tight seal therewith, an interior cavity, and a valve aperture positioned to fluidly communicate with the interior cavity and the receptacle portion of the container when the cap is mounted thereon. A valve member slidably carried on a valve post is disposed across the valve aperture, thereby normally sealing the valve aperture. The valve post may be moved to selectively open the valve aperture by depressing a thumb pad, and will automatically return to the closed position when the thumb pad is not being pressed due to the action of a spring. One or more enclosed spouts are molded integrally with the cap body, and fluidly communicate with the interior cavity. These spouts may be positioned at the sides, rather than the front, of the container.

The cap is such that a person may mount the cap on a container filled with a beverage, tilt the container and depress the thumb pad, and the beverage may then be poured through the spout into an awaiting vessel. When the user is not so pouring the beverage, the valve means remains closed, so that no beverage will spill or escape from the spout or the top of the container if the container is overturned.

BRIEF DESCRIPTION OF THE DRAWINGS

FIG. 1 is a perspective view of the cap with integral pouring spout of this invention;

FIG. 2 is a perspective view of the cap with integral pouring spout of FIG. 1 inserted into the open top of a beverage serving container;

FIG. 3a is a cross-sectional view of the interior of the cap with integral pouring spout taken through line 3—3 in FIG. 2 with the push button and valve in the closed position;

FIG. 3b is a cross-sectional view of the interior of the cap with integral pouring spout taken through line 3—3 in FIG. 2 with the push button and valve in the open position;

FIG. 4 is an exploded perspective view of the cap with integral pouring spout of FIG. 1 and the open top of a pitcher;

FIG. 5 is a top view of an embodiment of the cap with two integral pouring spouts extending from opposing sides of the cap;

FIG. 6 is a cross-sectional view of the interior of the embodiment of the cap with integral pouring spouts taken through line 6—6 of FIG. 5; and FIG. 7 is a partially cutaway left side elevation view of one embodiment of the cap and integral spout having a depending thumb pad.

DESCRIPTION OF THE PREFERRED EMBODIMENTS

The cap with integral pouring spout of this invention is shown in the accompanying FIGS. 1-6 and is referenced generally therein by the numeral 10.

Referring to FIG. 1, it can be seen that the cap 10 has a body portion 12, and is designed to be received within a pitcher 14 as shown in FIG. 2.

The pitcher 14 may be of any type suitable for storing and serving hot or cold beverages, and the cap 10 may be modified as necessary to accommodate such pitchers 14, however the pitcher described hereinafter has proven particularly well suited for use with the preferred embodiments of the cap 10 disclosed herein. The cap 10 and pitcher 14 are molded from ABS and SAN plastic resins.

As seen in FIG. 4, the pitcher 14 has a handle 15, an outer wall 16 and an inner wall 18 displaced from the outer wall 16 to form an air space 20 therebetween. The handle 15 may be of a type having a top surface 17 which extends from the outer wall 16 of the pitcher 14. The inner wall 18 defines a receptacle portion 22 into which a hot or cold liquid beverage may be placed. A circular collar 24 is attached in circumscribing relation to the top edges 26, 28 of the outer and inner walls 16, 18, respectively, the collar 24 defining an open top 30 of the pitcher 14. The air space 20 between the walls 16, 18 completely surrounds the receptacle portion 22 with the exception of the area adjacent the open top 30. Thermal insulating foam may be injected between the inner and outer walls 16, 18 to fill the air space 20, and further enhance the insulating properties of the pitcher 14.

The body 12 of the cap 10 has a generally cylindrical cap wall 32, the lower portion 33 of the cap wall 32 having a reduced diameter such that the lower portion 33 of the cap wall 32 may be received within the collar 24 and open top 30 of the pitcher 14. The cap wall 32 is fitted with threads 34 which are spaced apart and sized to engage corresponding threads 36 projecting from the inner surface of the collar 24 as shown in FIGS. 2 and 3a. These threads 34, 36 extend partially around the circumference of the cap wall 32 and collar 24, respectively, and are oriented such that the cap wall 32 may be inserted downward into the pitcher 14 through the collar 24 and rotated partially to engage the threads 34, 36. A vertical thread stop 37 is positioned in abutting contact with and connecting the trailing edges of the threads 34 on the cap 20. The vertical thread stop 37 thus prevents the cap 10 from being over-rotated beyond a quarter turn by contacting the leading edges of threads 36 on the pitcher 14. This permits a fluid-tight seal to be formed between the pitcher 14 and the body 12 of the cap 10. In some applications, such a fluid-tight seal may be formed by a pressure type fit between the lower portion 33 of the cap wall 32 and the open top 30 of the pitcher 14, however the threads 34, 36 further prevent the cap 10 from being dislodged from the open top 30 of the pitcher 14 in the event the pitcher 14 is dropped or knocked over.

Referring again to FIG. 3a, the body 12 includes a cover portion 38 which is disposed across the cap wall 32. The cap wall 32 and cover portion 38 thereby define an interior cavity 40 encompassed by the cap wall 32. The cap wall 32 and cover portion 38 of the body 12 are also molded to form an integral, enclosed spout 42, having a U-shaped lower spout portion 44 extending radially outward from the cap wall 32, and a planar upper spout portion 46 extending radially outward from the cover portion 38. A pair of arcuate recessed rim members 43 extend upwardly from the top surface 45 of the cap wall 32 along each side of the cap wall 32. The recessed rim members 43 are spaced apart at the rear of the cap body 12, and the front of the cap body 12 adjacent to the lower spout portion 44, and are recessed inwardly such that the cover portion 38 may be fitted over and slidably receive the recessed rim members 43 when the cover portion 38 is attached to the cap body 12.

The upper spout portion 46 is aligned with and sealingly attached to the upper surfaces 47 of the U-shaped lower spout portion 44 to define a rectangular bore 48 extending through the spout 42 and fluidly communicating with the interior cavity 40. The cover portion 38, including the upper spout portion 46, is attached to the top surfaces 47 of the lower spout portion 44, and the top surface 45 of the cap wall 32, and the recessed rim members 43 with an adhesive, sonic weld, or other appropriate fastening means.

The lower edge 50 of the lower portion 33 of the cap wall 32 defines a circular valve aperture 52. The valve aperture 52 should be disposed toward the receptacle portion 22 of the pitcher 14 when the cap wall 32 is received within the collar 24. The inner surface 54 of the lower edge 50 of the cap wall 32 is beveled upwardly. The lower portion 33 of the cap wall 32 defines an annular recess 55 into which a silicone gasket 56 is received, the gasket 56 maintaining a generally U-shaped form and presenting a curved outer sealing surface which extends a minimal distance radially outward beyond the edge of the beveled outer surface 57 of the lower edge 50 to sealingly contact the inner wall 18 of the pitcher 12.

In some applications, the silicone gasket 56 may not be required due to the dimensional specifications of the collar 24, lower portion 33 of the cap wall 32, and threads 34. In either instance, it may be preferable for the inner wall 18 of the pitcher 14 to define an annular ledge 59 against which the beveled outer surface 57 of the lower edge 50 or the lower surface of the gasket 56 may be pressed into sealing contact.

The outer surface 57 of the lower edge 50 is beveled inwardly to guide the cap wall 32 into the collar 24 when the cap 10 is being inserted into the open top 30 of the pitcher 14. When the cap 10 is properly inserted into the open top 30 of the pitcher 14, the valve aperture 52, interior cavity 40, and bore 48 form a path of fluid communication leading from the receptacle portion 22 of the pitcher 14 through the enclosed pouring spout 42.

Referring to FIGS. 3a and 4, the interior cavity 40 also contains an horizontal interior wall member 58, and a vertical interior wall member 60 connected to and extending upwardly from the curved terminal edge 62 of the horizontal interior wall member 58. The horizontal interior wall member 58 is connected to and extends radially inward from the cap wall 32 around the periphery thereof, with the exception of that portion of the cap wall 32 adjacent the lower spout portion 44 at which the horizontal interior wall member 58 is spaced apart from the cap wall 32 by the inward curvature of the curved terminal edge 62 of the horizontal interior wall member 58. The horizontal interior wall member 58 is positioned above the lower edge 50 of the lower portion of the cap wall 32 approximately one-third and one-half the distance between the lower edge 50 and the cover portion 38. The vertical interior wall member 60 is connected to and extends inwardly from the cap wall 32, and thereby forms an arcuate vertical wall connected to and coextensive along its lower edge with the curved terminal edge 62 of the horizontal interior wall member 58. The vertical interior wall member 60 extends upwardly along the cap wall 32 from the horizontal interior wall member 58 to a flat, horizontal top surface 64 flush with the top surfaces 45, 47 of the cap wall 32 and lower spout portion 44, respectively.

As seen in FIG. 4, the top surface 64 of the vertical interior wall member 60, and that area above the space between the curved terminal edge 62 and the cap wall 32, are covered by a plate 66 which is attached by sonic welds, adhesive, or other attachment means to the top surface 64 of the vertical interior wall member 60. This plate 66, the vertical interior wall member 60, and the horizontal interior wall member 58 serve to divide the interior cavity 40 into an upper subchamber 68 and a lower subchamber 70, the lower subchamber 70 also constituting a channel through which fluid may flow from the valve aperture 52 to the enclosed spout 42.

A circular valve member 72 having a beveled upper peripheral edge 74, sized and shaped to seat against the inner surface 54 of the lower portion 33 of the cap wall 32 and seal the valve aperture 52, is carried on the lower end of a valve post 76. The valve post 76 extends upwardly through a valve post aperture 78 int he center of the horizontal interior wall member 58, and terminates in an upwardly projecting, spade-shaped cap 80. The horizontal interior wall member 58 may have a cylindrical guide wall 82 extending above and below the horizontal interior wall member 58 and surrounding the valve post aperture 78. The horizontal interior wall 58 should define one or more pressure equalization orifices 84 extending entirely through the surface thereof, and located between the valve post aperture 78 and the cap wall 32 opposing the enclosed pouring spout 42.

The valve post 76 is slidably received within the valve post aperture 78 and extends into the upper subchamber 68. The clearance between the guide wall 82 and valve post 76 should be such that fluid will not flow therebetween from the lower subchamber 70 to the upper subchamber 68 when the pitcher 14 and cap 12 are tilted to one side.

A compression coil spring 86 having an inside diameter approximately equal to the outside diameter of the guide wall 82 is placed over that portion of the valve post 76 extending into the upper subchamber 68, and over the guide wall 82. A circular retainer 88 formed from a deformable plastic and having a diameter slightly greater than the outside diameter of the coil spring 86 and a central aperture 90 with a diameter slightly smaller than the diameter of the cap 80, is pressed down over the cap 80 until engaged in the recess 92 below the cap 80. The retainer 88 compresses the coil spring 86 such that a constant pressure is exerted on the retainer 88, thus urging the cap 80 and valve post 76 upward, pressing the valve member 72 into sealing contact with the inner surface 54 of the lower portion 33.

In some applications, it may be preferable to form the cap 80 by molding a small ring of plastic (not shown) onto the top of the valve post 76 above the recess 92, with the ring of plastic being crimped or otherwise deformed once the circular retainer 88 is placed over the valve post 76 to hold the retainer 88 in place, in much the same manner that a rivet operates.

To permit the valve aperture 52 to be selectively opened, the cover portion 38 of the cap 12 is fitted with a pivoting trigger bar 94, approximately as wide as the retainer 88, which contacts the top of the cap 80 when the cover portion 38 is seated on the top surface 45 of the cap wall 32. A pair of pivot projections 96 extending from opposing sides of the trigger bar 94 at the end thereof proximate to the enclosed spout 42 are received within slots 98 defined by a fulcrum piece 100 attached to the inner surface of the cover portion 38. The slots 98 are sized to retainingly engage the projections 96, but permit the trigger bar 94 to freely pivot about those projections 96. A thumb pad 102 at the opposing end of the trigger bar 94 is received within a semicircular well 104 defined by the rear portion of the cover portion 38, with the trigger bar 94 extending through an aperture 106 in the vertical well wall 108 and between the recessed rim members 43 at the rear of the cap 10 opposing the enclosed spout 42. The rearmost edge 110 of the thumb pad 102 may project beyond the outer surface of the cap wall 32, so as to be vertically disposed over the handle 15.

Referring to FIG. 7, in one embodiment of the cap 10 the rearmost edge 110 of the thumb pad 102 may be extended downwardly along the outside surface of the cap wall 32 to a point proximate or closely adjacent to the top surface 17 of the handle 15 when the thumb pad 102 is not depressed, so as to make it easier for a person with smaller hands or a weaker grip to reach the thumb pad 102. In such a case, there should be sufficient clearance between the thumb pad 110 and the top surface 17 of the handle 15 to permit the trigger bar 94 to be fully depressed, and the opening 104 need only be large enough to permit the trigger bar 94 and projections 96 to be inserted prior to attaching the cover portion 38.

Referring again to FIGS. 3 and 4, a semicircular skirt 112 depends from the bottom surface of the trigger bar 94 and is curved corresponding to the inner edge of the bottom wall 114 of the well 104. The skirt 112 serves to seal off the lower portion of the aperture 106 when the thumb pad 102 is raised to its highest position within the well 104 such that the interior of the cover portion 38 is not visible. In this position, the top surface of the thumb pad 102 may also project upwards above the top surface of the cover portion 38 as shown in FIG. 3a.

In operation, the receptacle portion 22 of the pitcher 14 is filled through the open top 30 with a liquid beverage. The cap 10 is then mounted on the top of the pitcher 14 by inserting the lower portion of the cap wall 32 through the collar 24, and rotating the body 12 such that the threads 34 on the body 12 engage the threads 36 on the collar 24, securely mounting the cap 10 on the pitcher 14 and forming a fluid-tight seal therebetween.

Referring to FIG. 3b, it can be seen that downward pressure on the thumb pad 102 will cause the trigger bar 94 to pivot downward about the projections 96, thereby pressing the cap 88, valve post 76, and valve member 72 downward, thus creating an opening between the valve member 72 and inner surface 54 such that fluid may flow through the valve aperture 52. The valve aperture 52 should therefore have as large a diameter as is practical given the thickness of the cap wall 32 and the beveled surfaces 54, 58 to permit the greatest flow rate for the fluid.

When the pitcher 14 is gripped by the handle and tilted from its generally upright position as shown in FIG. 2, and the push button is depressed to open the valve means, fluid from the receptacle portion 22 of the pitcher 14 may flow through the valve aperture 52 into the lower subchamber 70 of the interior cavity 40, and be poured outward through the enclosed spout 42.

Referring to FIGS. 5 and 6, it can be seen that one or more spouts 42 may be situated at the sides of the cap 10 relative to the thumb pad 102, the thumb pad 102 being positioned at the rear of the cap 10 and disposed above the handle 15 when the cap 10 is mounted on a pitcher 12. A single spout 42 may be placed along one of the sides of the cap 10, or at any position between the thumb pad 102 and the front of the cap 10. It may also be desirable to include a spout 42 positioned at the front of the cap 10, however, this presents the chance that a liquid beverage being poured from one spout 42 will spill from one of the adjacent spouts 42. The positioning of the spouts 42 at the sides of the cap 10 as shown in FIGS. 5 and 6 permits one to stand between two seated persons and alternately serve a beverage to each using a backhanded or forehanded pouring motion without altering one's grip on the handle 15 of the pitcher 14.

While the preferred embodiments of the present invention have been described, it should be recognized that various changes, adaptations, and modifications may be made therein the appended claims.

What is claimed is:

1. A cap removably mounted on a pitcher with which a user may pour liquids through a terminal outlet into a receptacle, said pitcher having an interior container region, an open top, a rear side, and a handle connected to said rear side of said pitcher, said cap comprising:
    a cap body, said cap body having a front side and a rear side, said cap body including an outer wall defining an interior cavity generally encompassed by said outer wall, said cap body being removably mountable on the open top of the pitcher;
    a valve aperture defined by said cap body, said valve aperture being in fluid communication with said interior cavity and the interior container region of the pitcher when the cap is mounted on the pitcher;
    valve means movable between a closed position substantially sealing said valve aperture and an open position;
    a spout extending from and connected to said front side of said cap body, said spout being the terminal outlet from which the liquid exits the cap, said spout projecting outwardly from said cap body and from the open top of the pitcher in an exposed position when the cap is mounted on the pitcher, said spout being removable from the pitcher each time the cap is removed from the pitcher, said spout defining a bore in fluid communication with said interior cavity; and
    actuation means for selectively moving said valve means from said closed position to said open position, at least a portion of said actuation means being adjacent to said rear side of said cap body opposing said front side such that said portion of said actuation means may be actuated by the user when gripping the handle,
    whereby the pitcher may be tilted generally in the direction of the spout and the valve means moved to the open position such that the liquid may flow from the interior container region of the pitcher through the open top and the valve aperture and into the interior cavity, and thereafter be poured through the spout into the receptacle.

2. A cap and pitcher assembly of the molded plastic beverage server type for use by a user in pouring a liquid from a terminal outlet into a receptacle, said cap and pitcher assembly comprising:
    a pitcher for containing and pouring the liquid, said pitcher having an interior container region, an open top end, a rear side, and a handle connected to said rear side of said pitcher;
    a cap body removably mounted on said open top end of said pitcher, said cap body having a front side and an outer wall defining an interior cavity positioned in fluid flow communication with said interior container region when said cap is mounted on said pitcher, said cap body outer wall having at least a portion thereof removably securable to said open top end of said pitcher;
    a valve aperture defined by said cap body, said valve aperture fluidly communicating with said interior cavity and the interior region of said pitcher when said cap is mounted on said pitcher;
    valve means movably mounted on and carried by said cap body, said valve means being movable between a closed position substantially disposed across said valve aperture to form a fluid-tight seal therewith and an open position displaced from said closed position, said valve means permitting the liquid to flow from the interior container region of said pitcher into said interior cavity of said cap when said valve means is moved to said open position, and said valve means preventing liquid from flowing from said interior cavity of said cap when said valve means is moved to said closed position;
    a generally enclosed spout extending from and connected in its entirety to said front side of said cap body, said spout being the terminal outlet from which the liquid exits the cap and pitcher assembly, said spout projecting outwardly from said cap body and being removable from said pitcher each time said cap body is selectively removed from said pitcher, said spout defining a bore fluidly communicating with said interior cavity and through which the liquid may be poured; and
    actuation means for selectively moving said valve means from said closed position to said open position, at least a portion of said actuation means being adjacent to said rear side of said cap body opposing said front side such that said portion of said actuation means may be actuated by the user when gripping the handle,
    whereby the pitcher maybe tilted generally in the direction of the spout and the valve means moved to the open position such that the liquid may flow from the container region of the pitcher through the open top and the valve aperture and into the cavity, and thereafter be poured through the split into the receptacle, and whereby the valve means, the actuation means, and the spout are removed from the pitcher together with the cap body when the cap body is selectively removed from the pitcher.

3. The cap and pitcher assembly of claim 2 wherein the outer wall of the cap body is received within the open top end of the pitcher and the valve means is disposed substantially between the valve aperture and the interior container region of the pitcher when the cap body is received within the open top end of the pitcher.

4. The cap and pitcher assembly of claim 2 wherein the valve means is at least partially received within the valve aperture when the valve means is in the closed position.

5. The cap and pitcher assembly of claim 2 further comprising:
    return means for returning the valve means to the closed position when the user ceases to actuate the actuation means.

6. The cap and pitcher assembly of claim 5 wherein the valve means is slidably carried on a valve post, and wherein the return means includes a compression coil spring substantially circumscribing said valve post.

7. The cap and pitcher assembly of claim 2 wherein the actuation means further comprises a thumb pad portion pivotably mounted on said cap body and movable between a raised position and a depressed position, said thumb pad being positioned proximate to the handle, whereby the user may selectively actuate the actuation means by exerting downward pressure upon said thumb pad portion of the activation means.

8. The cap and pitcher assembly of claim 7 wherein the handle of the pitcher includes a top surface portion, and wherein the thumb pad portion of the actuation means extends from the cap body to a position located closely adjacent to said top surface portion of the handle.

9. The cap and pitcher assembly of claim 2 further comprising sealing means for forming a fluid-tight seal between the cap body and the pitcher.

10. The cap and pitcher assembly of claim 9 wherein the sealing means comprises a pressure fit between the outer wall of the cap and the open top of the pitcher.

11. The cap and pitcher assembly of claim 9 wherein the outer wall of the cap body has an exterior, and wherein the sealing means comprises:
   a plurality of pitcher threads extending generally circumferentially around the interior of the open top end thereof; and
   a plurality of cap threads extending circumferentially around the exterior of a portion of the outer wall of the cap body which is removably mounted on the pitcher, said cap threads being positioned adjacent to said pitcher threads when the outer wall of the cap is mounted on the pitcher, said cap threads being oriented to mesh with the pitcher threads when the cap is rotated relative to the pitcher, said cap threads and said pitcher threads thereby forming the fluid-tight seal between the cap and the pitcher.

12. The cap and pitcher assembly of claim 11 wherein the cap body is rotated less than one full revolution in order to form the fluid tight seal between the cap body and the pitcher, rotation in excess of one full revolution being prevented by a stop member.

13. The cap and pitcher assembly of claim 11 wherein the cap body is rotated no more than one quarter revolution in order to form the fluid tight seal between the cap body and the pitcher rotation in excess of one quarter revolution being prevented by a stop member.

* * * * *